United States Patent
Smith et al.

(10) Patent No.: US 7,626,510 B2
(45) Date of Patent: Dec. 1, 2009

(54) SYSTEM AND METHOD FOR A LIGHT BASED CONFIGURATION GUIDE FOR ELECTRONIC PORTS

(75) Inventors: W. Eric Smith, Lindon, UT (US); William B. West, Sandy, UT (US); Stephen C. Coffin, Layton, UT (US)

(73) Assignee: Control4 Corporation, Draper, UT (US)

( * ) Notice: Subject to any disclaimer, the term of this patent is extended or adjusted under 35 U.S.C. 154(b) by 622 days.

(21) Appl. No.: 11/221,143

(22) Filed: Sep. 6, 2005

(65) Prior Publication Data

US 2006/0064526 A1 Mar. 23, 2006

Related U.S. Application Data (60) Provisional application No. 60/607,903, filed on Sep. 7, 2004.

(51) Int. Cl.
*G08B 5/22* (2006.01)
(52) U.S. Cl. ............... 340/815.45; 340/815.49; 340/815.53; 340/686.2; 340/686.4; 439/488
(58) Field of Classification Search ............ 340/815.45, 340/815.4, 815.47, 815.49, 815.53, 691.1, 340/693.5, 686.1, 687, 686.2, 686.4; 439/488
See application file for complete search history.

(56) References Cited

U.S. PATENT DOCUMENTS

| | | | | |
|---|---|---|---|---|
| 5,775,935 A | * | 7/1998 | Barna | 439/488 |
| 6,081,750 A | * | 6/2000 | Hoffberg et al. | 700/17 |
| 6,250,950 B1 | * | 6/2001 | Pallai | 439/441 |
| 6,971,907 B1 | * | 12/2005 | Stroud | 439/490 |
| 6,997,738 B1 | * | 2/2006 | Sutherland | 439/488 |
| 7,024,088 B1 | * | 4/2006 | Davis | 385/135 |
| 7,269,673 B2 | * | 9/2007 | Kim et al. | 710/72 |
| 7,314,392 B2 | * | 1/2008 | Pharn et al. | 439/676 |
| 2004/0073597 A1 | * | 4/2004 | Caveney et al. | 709/200 |
| 2004/0122970 A1 | * | 6/2004 | Kawaguchi et al. | 709/235 |
| 2007/0102505 A1 | * | 5/2007 | Yokota et al. | 235/375 |
| 2007/0264862 A1 | * | 11/2007 | Hallberg | 439/489 |
| 2008/0022023 A1 | * | 1/2008 | Kim et al. | 710/72 |
| 2008/0049790 A1 | * | 2/2008 | Caveney | 370/475 |

* cited by examiner

*Primary Examiner*—Travis R Hunnings
(74) *Attorney, Agent, or Firm*—Thorpe North & Western LLP (57) ABSTRACT

A media component is provided for controlling home automation signals. The media component can include a housing containing management circuitry. A plurality of communication ports can also be included for the media component. The communication ports may be coupled to the housing. In addition, a plurality of light units is provided. The light units are lit in order to guide a user to take a pre-determined action with respect to the communication ports.

18 Claims, 5 Drawing Sheets

SYSTEM AND METHOD FOR A LIGHT BASED CONFIGURATION GUIDE FOR ELECTRONIC PORTS

CROSS-REFERENCE TO RELATED APPLICATIONS AND CLAIM OF PRIORITY

This application claims priority to provisional patent application 60/607,903 entitled "LED INPUT GUIDE", filed on Sep. 7, 2004.

FIELD OF THE INVENTION

The present invention relates generally to the field of electronics.

BACKGROUND OF THE INVENTION

The price of electronic devices has continued to decrease dramatically. In addition, the types of consumer electronic components and home automation electronics that can be purchased have also continued to increase. For example, DVD players, large screen TVs, multi-carousel CD players, MP3 players, video games consoles, and similar consumer electronic items have continued to drop in price and become more widely available. Examples of home automation electronics that are available include wireless networks, wireless power controls, powered windows, garage doors, and even networkable appliances. These factors and other influences have made home audio, home video, and home automation electronics more available to users.

In the past, electronics were relatively expensive and computer chips were used in mass consumer items or in applications where the cost of the electronics was warranted. However, in today's mass manufactured electronics industry, the price of electronic components has reached the point where computer processors, networks and smart devices are being embedded into common home appliances such as washing machines, refrigerators, stoves, HVAC controllers and the like. In addition, light switches, garage door openers, relays for fireplaces, and similar items can be controlled from a personal computer using wired or wireless networking protocols. As the price of building and home automation components has decreased, these items are being used more frequently in residential homes and office buildings.

Many consumers are enthusiastic to buy consumer electronic and home automation equipment because of the promise of theater quality, high resolution video, high fidelity audio output, and centrally controllable household automation systems. However, after the electronic components and home automation products are purchased by consumers, they often struggle to setup and configure their system, and sometimes the electronic components will remain in a box for some time because the users do not really know how to connect the components together. For example, electronic components such as DVD players are often connected to televisions and other audiovisual components in a manner that does not utilize their full capability.

The reason why many intelligent individuals are not able to easily install or utilize the full capability of these electronic components is because it can be difficult, complex, and time consuming to setup and configure electronic components to function properly. In fact, many consumers often try to find a friend or another electronics-savvy individual to connect their components properly and make such systems work. Alternatively, consumers may employ an audio-visual and/or home automation consulting company that specializes in the sale and setup of such systems. This way the consumer is able to avoid actually installing and configuring the system. Due to the setup difficulty for many systems or the expense of using a consultant, less experienced electronics consumers may avoid buying feature-rich audio/video and home automation systems.

Sometimes consumers have purchased electronic components including DVD players, surround-sound systems, wireless dimmers, wireless HVAC controls, remote control switches, and high quality cables, but the users do not setup the system properly because of its complexity.

Certainly, an individual with some experience may connect a DVD player to their TV, but the user may not know how to set up an entire home automation and/or home theater system. For example, it can be more complex to setup surround sound or component video than to setup a DVD player alone. Installing home automation networks can also be a daunting task to the uninitiated.

A home automation system may remain unconnected or partially connected for a period of time, or the full functions of the electronic components may remain dormant. Users of such electronic equipment may not have the time to set up a complex system even if they have the appropriate knowledge because it may take several hours or days to install and configure a system. In addition, it may take weeks or months before an individual has time to sit and read the manuals in order to understand how to install and configure a home automation system properly. In the worst case, a user may never read the manual or configure the equipment properly.

There are also many individuals who do not have the experience or knowledge to understand how the audio-visual system should be connected together. These individuals may not even have the desire or interest to ever read the manuals or understand how components should be wired together.

For example, there are receiver systems and/or switching systems that enable consumer electronics to be connected into a central receiver. Then the switching and routing of signals between multiple components can be controlled through that receiver. Users who are able to properly connect all of their components to such a receiver have the benefit of being able to easily control broadcast television, satellite, cable, various types of surround sound, CD inputs, DVD inputs, home automation components, and provide other signal routing between various electronic components. However, despite the fact that a receiver is valuable once it has been connected up properly, it can be difficult to setup such a receiver, especially for users who have not had the appropriate training or time to sit and test cable configurations.

SUMMARY

A media component is provided for controlling home automation signals. The media component can include a housing containing management circuitry. A plurality of communication ports can also be included for the media component. The communication ports may be coupled to the housing. In addition, a plurality of light units is provided. The light units are lit in order to guide a user to take a pre-determined action with respect to the communication ports.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

An embodiment of the present invention includes a system for aiding individuals in configuring home automation and audio-visual components through a media component. Even those individuals who do not have the experience or knowledge to understand how an audio-visual and home automation system is connected together through a media component can be guided by the present invention and be quickly instructed to connect and configure the media component. The present invention is particularly valuable for individuals who may not have the desire or interest to read manuals and technically understand how components should be wired together.

Figure 1:
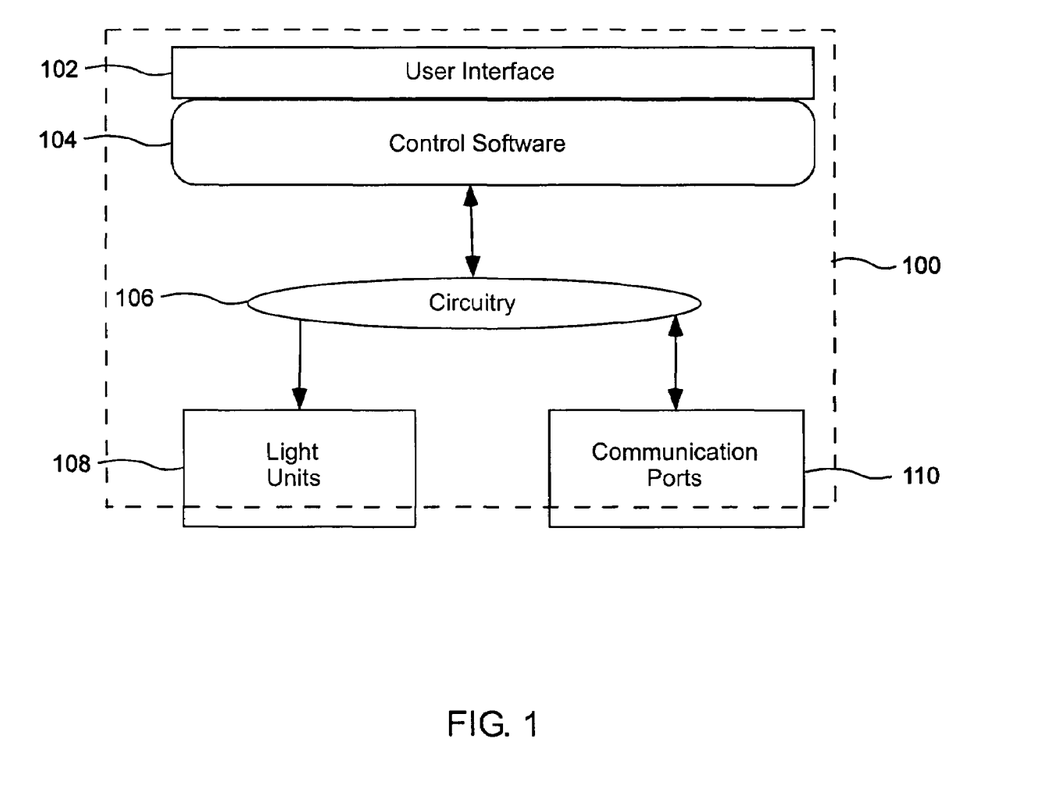
FIG. 1 illustrates a block diagram of components contained within a media component in an embodiment of the invention.

FIG. 1 is a high level block diagram illustrating one embodiment of present system that includes a media component for controlling home automation signals. The system may include a housing 100 containing management circuitry 106. The management circuitry can control the switching, routing, filtering, amplification, and modification of signals received by the media component. A media component can be generally defined as an electronic system that may include device automation controls, receiver functions for audio and video, a central processor and user interface, and other automation and media functions.

A plurality of communication ports 110 can also be provided for the media component. These communication ports may be mounted directly into the housing as known to those skilled in the art or removably coupled to the housing in an unconventional manner. The communications ports can be mounted in a panel of the housing that is located on a back or side face of the housing. Alternately, the communication ports can be mounted on the front face of the media component.

A plurality of light units 108 can be provided, and a light unit may be lit in order to guide a user to take a pre-determined action with respect to one or more communication ports. Each of the plurality of light units may be associated with at least one separate communication port and may be lit up or activated in order to instruct a user to connect a communication cable to the communication port.

A user interface 102 can be provided that accepts user input and provides feedback from control software 104 which controls the routing, switching and communications that are taking place. The light units may be any type of light that can be viewed by an end user. The light units that may be used include, but are not limited to, light emitting diodes (LEDs), incandescent lights, organic light emitting diodes (OLEDs) and liquid crystal displays (LCDs).

The plurality of light units may be separately colored or even multi-colored to represent different functions of the communication ports. For example, input communication ports may have differently colored light units as compared to the output communication or switching communication ports. Different functions may be indicated by different types of light colors so that users can better differentiate configurations with the media component. Alternately, the independently colored lights may represent different actions to be taken with respect to the communication ports. For example, a red color may be used if an incorrect device is connected to the port and should be disconnected, or a green color may be displayed if a device is sending or receiving data correctly. Another example of a multi-colored lights embodiment is the use of different colored lights to instruct a user regarding whether a stereo or a mono cable should be hooked up to a given port.

The lights units can also serve other functions in the media component. Light units can be used to represent whether a signal is coming in a given switching or amplification port. The light units can be used in an audio matrix switch to show that an audio input has been assigned to that port. A light unit used on an Ethernet port can show data speed or the arrival of data packets. Signal levels can also be shown using a multi-colored LED and then certain colors can show clipping, etc. The light units can also serve other well known similar functions where lights units are used.

Figure 2:
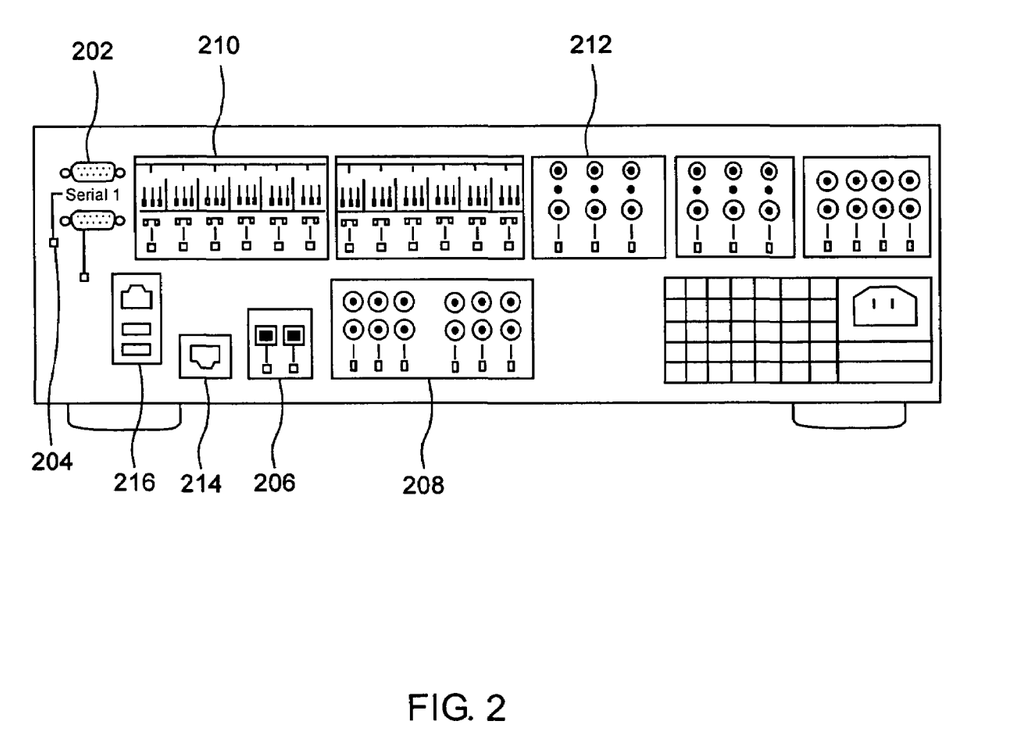
FIG. 2 illustrates a diagram of a rear panel of a media component with light units and communication ports.

FIG. 2 illustrates that the association or referencing between the light units 204 and communication ports 202 can be defined using a number of different methods. It is beneficial when the light units are referenced to the communication ports in such a manner that is clear to an end user which communication port is being referenced when the light unit is activated or lit up. This is because the light units are generally activated to instruct a user in connecting or disconnecting a communication cable or electronic device to a communication port.

One example of referencing the light unit to the communication ports is locating the light unit physically adjacent to the communication port. A printed box may surround and spatially show the relationship between the light unit(s) and the communication port(s). Other printed indicia can be used to reference the light units to the communication ports. For example, printed lines or arrows on the housing panel can reference the light units to the communication ports. Another example of referencing the light units to the communication ports is to using a matrix on the housing panel referencing the light units to the communication ports. Other referencing methods can also be used, such as physically coupling the light unit to the communication port or embedding the light unit into the communication port itself.

In addition to the embodiment where a one-to-one correspondence exists between a communication port and a light unit, other configurations may not necessarily use a one-to-one correspondence between the light units and ports. For example, there may be a matrix that has a control port (or set of control ports) at each cell in an M×N matrix. Then the light units can be located down an outside column of the matrix and across an outside row of the matrix. In order to indicate which port should have an electrical cable connected to the port, two light units can be activated. One light can be lit in the column indicator group and the second light can be lit in the row indicator group. For example, the column indicator can be horizontally located and the row indicator can run vertically at the border of the communication ports. Thus, the user would know that the intersection point (i.e., column and row) of the two lights is the port which the cable is to be connected to.

Alternatively, each part of a port may include a separate light unit. For example, there may be a separate light for an audio port and for a video port which comprise an RCA video port. Using separate lights for each part of the port can instruct the user that one of the cable outputs should be connected to the video port and the second output of the cable should be connected to the audio port.

FIG. 2 further illustrates that the communication ports or connection ports can be switching or home automation-oriented controls such as relay outputs 210, contact-sensing inputs, switches, analog audio/video signal inputs and outputs 208 or digital audio/video signal inputs and outputs 206 that are switched inside the media components, wireless controller devices, or other control communication ports that can manage home automation devices. The communication ports may include more data-oriented ports such as serial ports 202, parallel ports (not shown), Ethernet ports 214, USB (Universal Serial Bus) ports and modem ports 216, infra-red inputs and output 212 or any other electronic communication port known to those skilled in the art. The types of automation ports, communication ports, analog and/or digital signal ports, or switching ports that can be provided are not limited and can include any electronic devices that exist to be connected to the ports.

Figure 3:
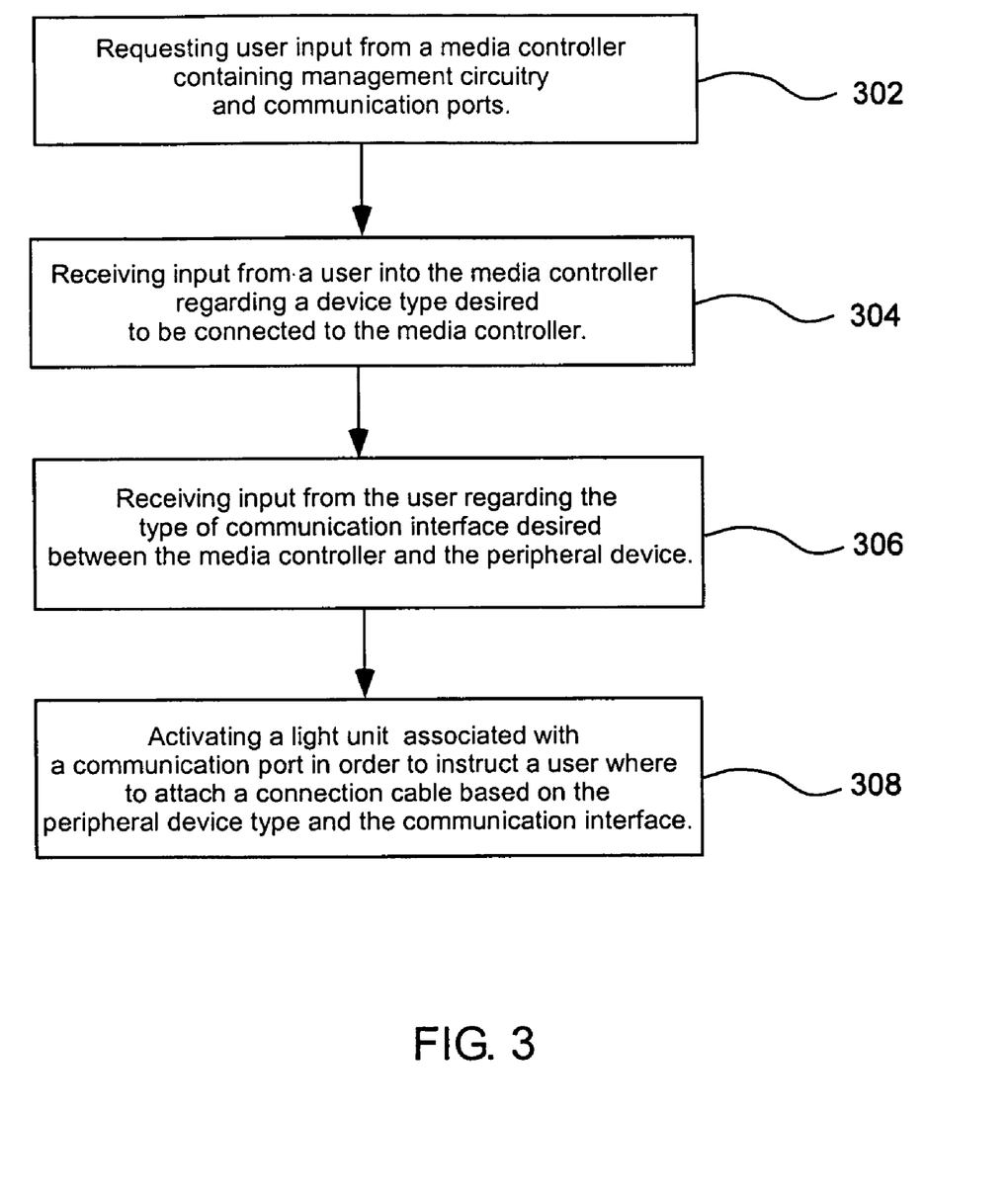
FIG. 3 flow chart depicting a method for directing a user in configuring and routing home automation components.

FIG. 3 illustrates a method for directing a user in configuring a media component or receiver. The method includes the operation of requesting user input into a media component containing management circuitry and communication ports as in block 302. This user input can be provided via a graphical user interface, text interface, through a file uploaded by the user from a separate interface, or any other user interface.

A further operation can be receiving input from a user for the media component regarding an automated device type desired to be connected to the media component as in block 304. For example, the end user can input the type of automated control device that will be connected to the controller. Example types of automated devices that might be selected by the user can include a HVAC thermostat, light switches, garage door openers, door monitors, DVD players, televisions, personal computers, and audio equipment.

Yet another operation, as in block 306, can be receiving input from a user for the media component regarding the type of communication desired between the media component and the peripheral equipment. An example of this could be a user deciding whether they want the video output of the media component to drive the video input of a television using a VGA video signal and cabling method versus using a composite video signal and cabling method for better video quality.

After the user input has been received, a light unit may be activated on the media component associated with a communication port in order to instruct a user where to connect a connection cable to the media component based on the automated device type and the desired communication interface, as in block 308.

The activation of a light unit can coincide with instructions on a television, computer monitor, or LCD screen that instruct the user to connect a cable or attachment device to the communication port. This directs the user to the light unit at the appropriate point in time to complete the connection or action, and then after the connection or action (e.g. setting a switch or connecting to a port) is complete, the user can push a button on the media component, receiver, or user interface, to provide feedback to the system and user that the connection or action has been successfully completed. When one connection is complete, the system can then direct the user to move onto the next connection.

In another embodiment, input from the user can be requested regarding the type of communication interface desired to be used with the media component. In response to the type of communication interface being connected, a light unit can be activated. Thus, if a certain type of device is recognizable, a user may request a connection by a certain protocol. For example, if the device type is not known but the user knows that an audio connection is needed, then the light unit next to the audio connection can be activated.

The end user may also know that they want to route a video signal between a television and a DVD player. In this situation, the user provides detailed input regarding the routing of a communication signal between a first device type and a second device type. Then the media component or receiver can route the signals between the two devices. This input can be presented using electronic survey questions to determine the automated device type to be connected to the media component.

As discussed previously, the present system and method includes a media component for configuring and routing home automation signals and audio-visual signals. The light-based configuration guidance system aids in instructing a user regarding the connection and configuration of electronic ports on the media component and the electronic components connected to the media component.

Once electronic components are connected to the media component, the media component can be used to control and manage the devices connected to it. In addition, the media component may route or switch the signals between electronic components for a user desired output. This allows the media component to switch between several settings in a home automation system, such as a movie setting, music output setting, satellite TV setting, etc.

Examples of home automation devices and electronic components that can be controlled through the media component include home automation equipment such as: lighting control switches, fireplace relays, dimmers, thermostats, HVAC, timers, alarm systems, perimeter monitoring systems, refrigerators, freezer alarms, stoves, clothing washers and dryers, and other types of home automation equipment can be connected into the media component. While the term home automation is being used in this application, these electronic components that have been described can be used with the media component in other settings including business, education, government, hotels, churches, broadcasting, and entertainment facilities.

Examples of other electronic components that an individual may desire to couple to the media component, either through wired or wireless means, include: personal computer systems, televisions, projectors, computer monitors, video projection systems, CD players, DVD players, VCRs, audio equipment, surround sound stereo equipment, video cameras, microphones, and other audio-visual and entertainment equipment. In addition, other home and business equipment can be connected to the media component such as: USB devices, FireWire devices, serial and parallel connections, fiber optic connections, a computer network using an Ethernet or wireless connection, and Internet connections.

Figure 4:
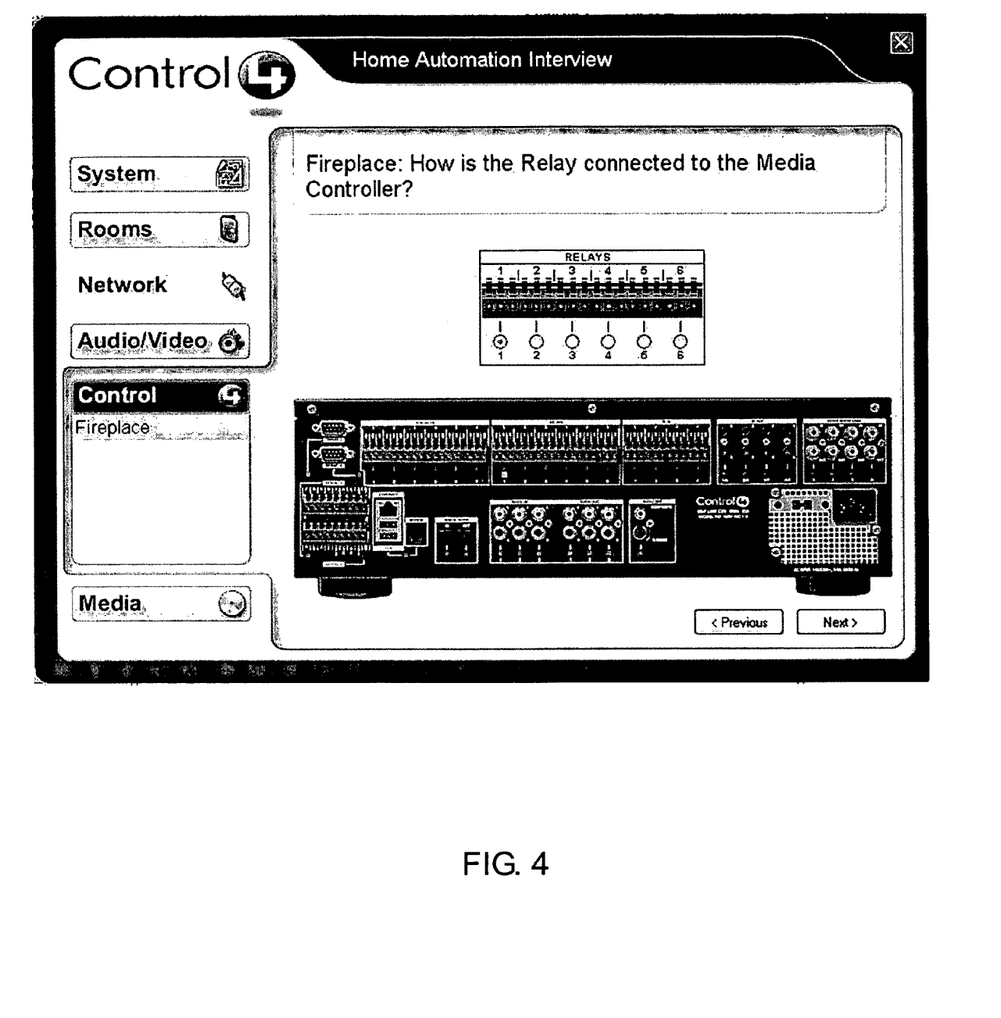
FIG. 4 is a screen shot of a guide screen for connecting a relay component to a media component in accordance with an embodiment of the present invention.

The media component can have a housing containing switching or routing circuitry and other electronics for appropriately controlling, switching, processing, and routing electronic signals. The housing can have a panel on one of the faces of the media component in which the ports are mounted. The panel can be located on the back, side, top, front or even bottom of the media component. However, the port panel is most likely to be located on the rear of the media component as illustrated in FIG. 4.

A plurality of communication ports can be located in the panel to interface with or control any of the devices that have been described previously. As illustrated by FIG. 4, many of these ports can be electrical connection ports such as audio or video ports, relay ports, serial communication ports, parallel communication ports, USB ports, Ethernet ports, or similar ports for receiving electrical connection cables. These communication ports may receive input, send output or both. In addition, the ports can be male, female, or another type of electrical connection.

A plurality of light units can also be located on the port panel and each of the light units can be associated with one or more of the communication ports. In one embodiment, the light units will be located near the respective communication port. Then each of the light units may be activated or lighted in combination with some other electronic guidance provided through a monitor, TV or LCD display panel. The electronic guidance may be a slideshow, menu driven instructions, video instructions, or audio instructions to guide a user to take a predetermined action with respect to the communication ports.

For example, a user may desire to connect a composite video cable from a DVD player to the media component. The user may user a graphical interface, physical buttons, a remote control or another known user interface to communicate with the media component to tell the media component that the user desires to connect to a composite video cable from the DVD player to the media component. In one embodiment of the invention, the media component can activate (i.e., light) the light unit adjacent to the composite video port on the rear panel of the media component. This notifies the user that the user should connect a composite video cable into the port next to the active light.

In another embodiment, the user may notify the media component that the user desires to connect a fireplace relay to the media component and this notification can take place using a graphical interface through a television or computer monitor connected to the media component. This allows the media component to display an image of the connection port on the media component to the user and graphically highlight where a cable should be hooked up to the media component. The corresponding light unit or LED may also be activated or lit up on the media component to show the user directly where to connect the cable to the media component. FIG. 4 illustrates a home automation interview as just described.

In the past, the rear or side of an electronic device has not been considered a place to locate user interface indicators or lights. Neither the side nor rear of the electronic device has user controls, or has generally been used for communication interface connections, electrical connections or power connections. One reason lighted indicators are not generally used in the rear or side of an electronic component is because these side or rear panels of a device are not expected to be visible after the electronic component has been installed. Lighted indicators provide a guided user interface that quickly teaches a user how to setup a relatively complex electronic device.

The media component can include management, switching and/or routing circuits to control the one or more light units associated with separate communication ports. The management circuits can light up the lights in order to instruct a user to connect a communication cable to a selected communication port. In addition, the switching component can route signals from one input component to a separate output component. For example, the signal from a DVD player can be routed out to a television or HDTV monitor when a user selects that option. Other types of home automation, audio, video, and relay types of routing can take place.

Figure 5:
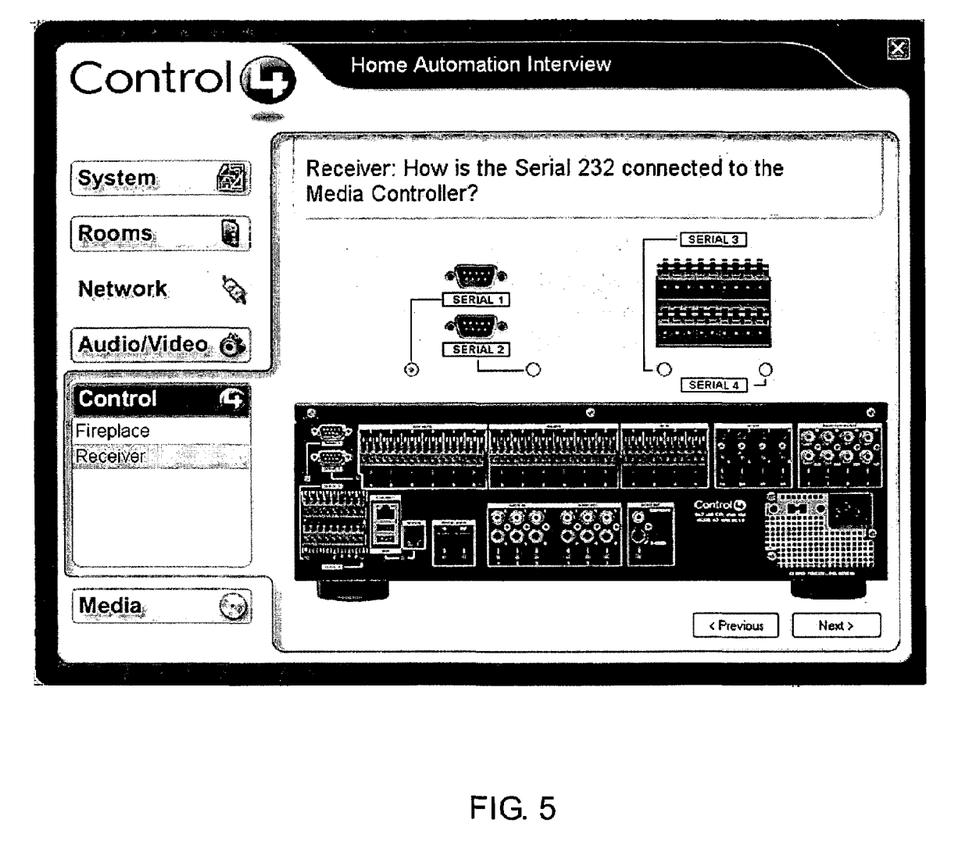
FIG. 5 is a screen shot of an additional guide screen for connecting a serial component to a media component in accordance with an embodiment of the present invention.

FIG. 5 further illustrates that the present system and method provides direction to an end user for configuring and routing audio-visual signals, computing device signals, and home automation signals through a media component containing switching circuitry and communication ports. Input can be received from a user regarding a peripheral device desired to be connected to the media component. FIG. 5 illustrates that the user may desired to connect a network device to a Serial RS-232 device.

In another example, a user can communicate to the media component that he or she wants to connect a CD player to the media component. The user may communicate with the media component using a graphical user interface that is displayed on a television or monitor as in FIG. 5. In addition, the graphical user interface can present guided user questions or an interview about the devices to be connected (e.g., question wizards). The home automation interview may then ask the user questions or provide an electronic interview about the type of device(s) or electronic components that the user desires to connect to the media component. The users responses can be entered into the media component using a remote control, a separate keyboard, buttons on the media component, a touch screen LCD on the media component, or other known input devices.

Lists of device types that can be connected to the media component may be presented to the user. The device lists can start with selections for the user to determine whether the device is a home automation control, audio/video device, computer networked device, or a room control device. Sub-lists can also be presented after a type of device has been selected. For example, the user may select between CD players, DVD players, VCR players, etc., after the classification audio/video device has been selected. There may be manufacturer and model sub-lists where the user selects their exact electronic component model (e.g., Sony DVD Player 9000). Each of the sub-lists may have a wide variety of manufacturer and model sub-lists as described.

The guided user questions can also display an image of a communication port panel for the type of electronic component selected that is desired to be connected to the media component. Then the image on a screen can graphically illustrate where the cables should be connected to the type of device selected. The graphic illustrations to indicate where the cables should be plugged into the electronic component's ports can be provided using on-screen highlighting, callouts, animations, or similar elements.

In one embodiment, the external components, home automation components, and electronic peripherals being connected to the media component can also have LEDs or lights on their own port panels. Then the media component can send signals to the external device and activate lights on the external device. Some sort of previous communication channel will have been made with the external device in this situation. Alternatively, an electronic component may have its own internal controls to activate the light on its port panels based on the type of connection being made with the media component.

As described previously, the user can select or input the type of electronic connection or data connection desired to be made between the media component and the remote device.

For example, a composite audio/video connection can be selected. Other types of connections that can be selected by the user are RCA audio connectors, USB connectors, FireWire connectors, component video, fiber optic connections and similar data and control protocols known in the art.

After the media component has received specific information about the electronic component type and the connector or signal protocol being used, then the media component can instruct the user how to configure the components. In order to instruct the user which port to connect a connector or cable into, a light unit on the media component can be activated.

The activated light may be associated with a communication port in order to quickly point out to a user where to connect the selected electronic connection cable to the media component. As described previously, the light can be adjacent to the ports and or associated with the ports using printed indicia, markers, callouts or printer pointers on the outside of the media component. When the user is able to identify the port using the light units, then the user can connect an electronic connection cable to the media component more easily than would otherwise be possible.

An auto-detection system can be included in the present system and method to enable the media component to automatically detect the type of device that is being attached. A detection signal can be sent by media component to a peripheral device, control or media component, when it has been detected that an external device is being connected. The device may then send a response to the media component along with information about the type of device being connected. Based on this electronic interchange, the media component can determine the physical communication port where device is connected and also the type of device that is connected. This allows the media component to load any drivers needed to communicate with the device. The auto-detect system allows the media component to inform the end user whether the user has connected the correct device to the media component using the desired communication protocol. If the media component detects that the wrong controller has been plugged in the wrong ports, then remedial instructions can be provided.

In the past, LEDs have been used to indicate that an electronic component is on or off. Alternatively, LEDs have also been used to describe power levels or output. For example, audio equipment has used LEDs to depict the levels of audio power output or equalization. The previous mindset in using LEDs is that the LEDs should be used as output indicators for the users of an electronic component. In addition, lights or LEDs have typically been located on the front with the user interface of an electronic component to show a device status or that a feature was enabled. LEDs have also been used to show signal strength, gain, etc.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A media component, comprising:
    a housing containing management circuitry;
    a plurality of communication ports for the media component, the communication ports being coupled to the housing. wherein at least one of the communication ports is a relay controller; and
    a plurality of light units, wherein a light unit is lit in order to guide a user where to connect a device to at least one of the plurality of communication ports based on a device type.

2. The media component as in claim 1, wherein each of the plurality of light units is associated with a separate communication port and each is configured to be lit up in order to instruct a user to connect a communication cable to the communication port.

3. The media component as in claim 1, wherein the plurality of light units are independently colored to represent different functions of the communication ports.

4. The media component as in claim 1, wherein the plurality of light units are independently colored to represent different device types to be connected to the communication ports.

5. The media component as in claim 1, wherein the light units are selected from a group consisting of light emitting diodes (LEDs), incandescent lights, organic light emitting diodes (OLEDs) and liquid crystal displays (LCDs).

6. The media component as in claim 1, wherein the plurality of communication ports are selected from the group consisting of audio inputs, audio outputs, video inputs or video outputs.

7. The media component as in claim 1, wherein the plurality of communication ports are relay controllers.

8. The media component as in claim 1, farther comprising a panel for the housing and supporting the communication ports configured to be located on a back or side face of the housing.

9. A media component, comprising:
    a housing having management circuitry;
    a user interface associated with the management circuitry, said user interface adapted to allow a user to select a desired communication interface;
    a plurality of communication ports being coupled to the housing; and
    a plurality of light units referenced to the communication ports, wherein the light units are referenced to the communication ports using a matrix on a housing panel referencing the light units to the communication ports, and wherein the light units are activated to instruct a user in connecting a communication cable to a specific communication port based on a user selected communication interface.

10. The media component as in claim 9, wherein the light units are referenced to the communication ports by locating the light units physically adjacent to the communication port.

11. The media component as in claim 9, wherein the light units are referenced to the communication ports using printed indicia referencing the light units to the communication ports.

12. The media component as in claim 9, wherein the light units are referenced to the communication ports using printed lines on a housing panel referencing the light units to the communication ports.

13. A method for directing a user in configuring a media component, comprising the steps of:
    providing electronic survey questions to determine the device type to be connected to the media component;

requesting user input into a media component containing management circuitry and communication ports;

receiving input from the user of the media component regarding a device type desired to be connected to the media component; and activating a light unit on the media component associated with a communication port in order to instruct a user where to connect a connection cable to the media component based on the device type.

14. The method as in claim 13, further comprising the step of receiving input from the user regarding a type of communication interface desired to be used with the media component, wherein a light unit can be activated based on the communication interface requested.

15. The method as in claim 13, further comprising the step of receiving input from a user regarding a routing of a communication signal between a first device type and a second device type.

16. The method as in claim 13, further comprising the step of connecting a connection cable to the communication port on the media component based on the light that is being displayed.

17. The method as in claim 13, wherein the light units are selected from a group consisting of light emitting diodes (LEDs), incandescent lights, organic light emitting diodes (OLEDs) and liquid crystal displays (LCDs).

18. A method for directing a user in configuring a media component, comprising the steps of:

requesting user input into a media component containing management circuitry and communication ports;

receiving input from the user regarding a type of communication interface desired to be used with the media component; and activating at least two light units on the media component associated with a matrix communication port in order to instruct a user where to connect a connection cable to the media component based on the communication interface desired.

* * * * *